July 17, 1928.
G. F. LANGERMEIER
1,677,241
STORAGE BATTERY MOLD
Filed Oct. 29, 1923
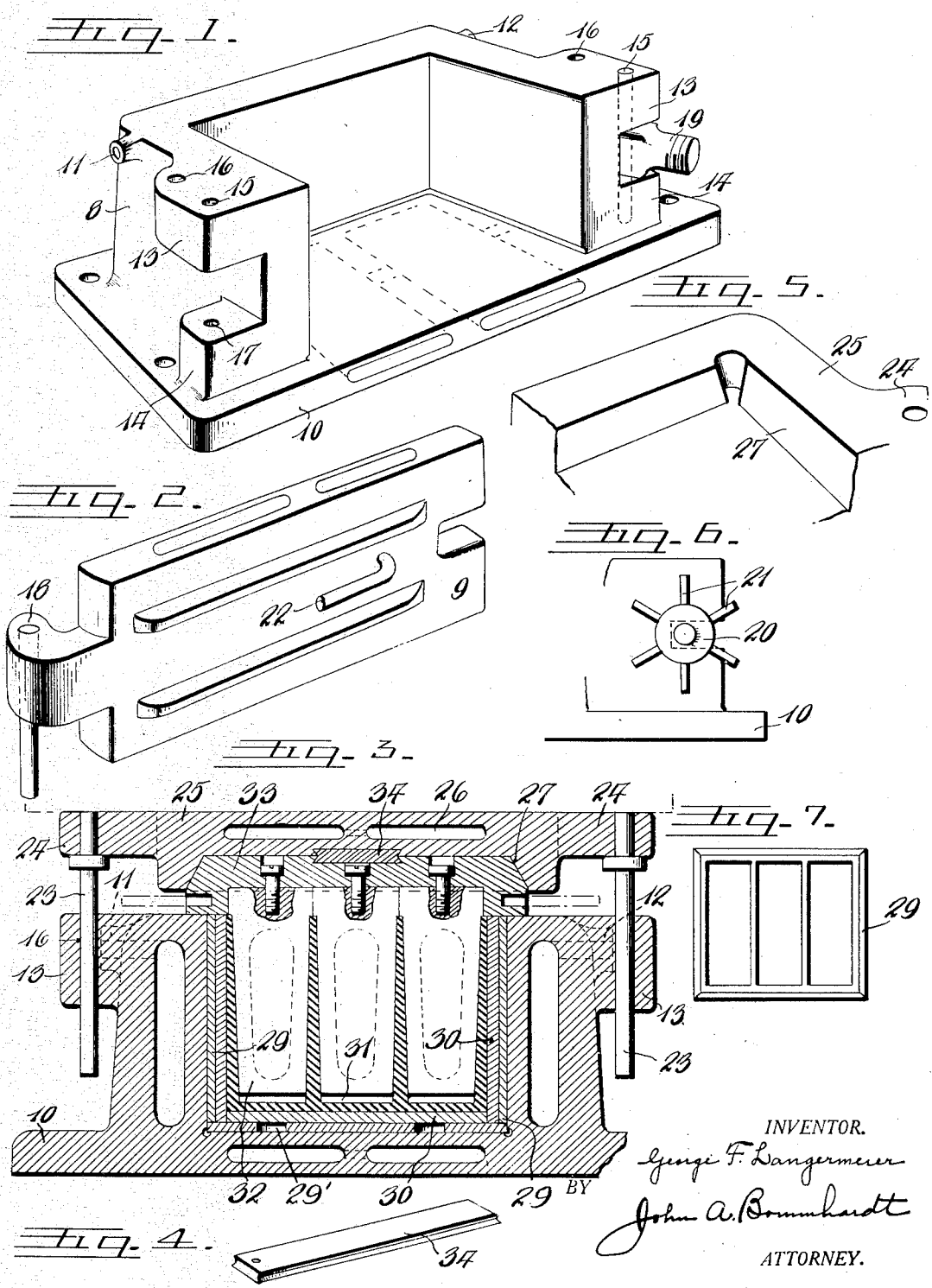
INVENTOR.
George F. Langermeier
BY John A. Bommhardt
ATTORNEY.

Patented July 17, 1928.

1,677,241

UNITED STATES PATENT OFFICE.

GEORGE F. LANGERMEIER, OF CLEVELAND, OHIO.

STORAGE-BATTERY MOLD.

Application filed October 29, 1923. Serial No. 671,445.

This invention relates to improvements in storage battery molds and has for an object the provision of such a mold constructed to facilitate quantity production of rubber storage battery boxes.

Another object is to provide a mold of this character which is primarily designed to take care of the preliminary steps in the molding of a storage battery box, after which the box is removed to be placed in a vulcanizer in which it is completed.

A further object is to provide a mold of this character which is readily adaptable for use as a squeeze out process mold, or for continuous curing of the battery box.

A further object is to provide a mold of this character wherein the structure is such as to permit ready installation and removal of a storage battery box "form".

A still further object is to provide a mold wherein the body portion and a core centering head are relatively fixed with respect to lateral movement as between the members, the core being the only portion subject to lateral movement.

It is likewise an object to provide a mold including design plates so constructed as to be self-supporting, consequently free from the usual tendency of collapsing.

Other objects will be in part obvious and in part pointed out hereinafter.

In order that the invention and its mode of operation may be readily understood by persons skilled in the art, I have in the accompanying illustrative drawings, and in the following detailed description based thereon set out one possible embodiment of the same.

In these drawings:

Fig. 1 is a perspective view of the main body portion of a mold, the door and top plate being removed therefrom.

Fig. 2 is a detail perspective view of the door.

Fig. 3 is a substantially central vertical longitudinal section through the assembled mold, the cores being shown in elevation.

Fig. 4 is a detail perspective view of the connecting key employed in securing together the core carrying head and the centering head.

Fig. 5 is a detail perspective view showing the construction of a centering face which engages the core carrying head.

Fig. 6 is a front elevation showing the locking member, which with the swinging latch shown in Fig. 1, locks the door in closed position, and Fig. 7 is a plan view showing the general configuration of one form of storage battery box; the design plates with their mitered corners being shown engaging the side of said door.

In the usual method employed in constructing storage battery boxes of rubber, it is generally customary to employ a single mold for shaping the rubber and in addition for curing the box being made.

This is what is termed the continuous curing process and when employed eliminates the possibility of turning out rubber storage battery boxes in a sufficient quantity to provide a fair return to the manufacturer.

With the system or method herein employed, I employ a mold such as illustrated for the purpose of squeezing the rubber into the shape of the storage battery box, the heat in the mold causing the rubber to set to a certain degree. At this point the box together with the design plates and the supporting frame or form is removed from the mold and placed within a vulcanizer. It is quite obvious that since this mold is to be used for squeezing out these storage battery boxes and it requires only a very short period of time to accomplish this, that these boxes formed of rubber may be turned out in sufficient quantity and with such speed as to render such production profitable.

Having more particular reference to the drawings throughout which similar characters of reference designate similar parts, this improved storage battery box mold may be broadly stated as comprising a main body portion 8 having a recess, opening through the top and one side of the body, adapted to be closed by a horizontally swinging hinged door 9; said recess being adapted for the reception of the box wherein will be placed a block of rubber adapted to be shaped by insertion of the set of cores carried by a core head as shown in Fig. 3. This core head 33 with its depending cores is centered accurately through employing a centering head 25 which is directed downwardly under pressure of the usual platen. The body portion of this mold comprises a flat base 10, which may be cored out to provide steam chambers, and is formed integrally with upstanding walls adjacent its two ends and one side, thereby leaving one open side which provides means for readily inserting or removing the storage battery box and its form. These walls are channeled or chambered as shown in Fig. 3, and are adapted to be heated by steam or the like, which enters through the opening 11, leaving the body through an outlet opening 12. Formed integrally with the outer portions of the upstanding walls at the opposite ends of the mold are pairs of vertically spaced horizontally directed lugs 13 and 14, the upper lugs 13 having formed therein vertically extending spaced openings 15 and 16, the openings 15 adjacent the front edge of the lugs being vertically alined with sockets 17 formed in the lower lugs 14. Arranged between the vertically spaced lugs at one end of the mold is a hinge portion 18, vertically apertured for alinement with the aforementioned openings 15 and 17. A hinge pin or the like is adapted to be arranged in the alined openings and providing means for mounting the door 9 upon the mold.

This door 9 is provided with suitable steam chambers whereby to assist in heating the interior of the mold, and is bifurcated for the reception of the hinged latch 19 which is mounted between the lugs 13 and 14 at the end of the mold opposite the hinging point of the door.

This swinging latch 19 is provided with a threaded extremity which moves into the bifurcation, and is retained therein by a rotatable locking nut 20 carrying handle portions 21 as shown in Fig. 6. In order that the door may be readily operated it is provided as illustrated in Fig. 2 with a substantially L-shaped handle member 22 which may be formed integrally with the door or attached thereto in any well known manner.

The opening 16 in each of the upper lugs 13 is adapted for the reception of depending dowels, or guide pins 23, carried by oppositely directed bosses 24 which are formed integrally with the centering head portion 25, whereby the said head portion and mold body 8 are positively held against relative lateral movement. This head portion 25 is also provided with steam chambers 26 whereby to further assist in heating the interior of the mold. The lower face of the centering head portion is recessed as indicated in Fig. 3 of the drawings, this recess having its side walls 27 inclined or bevelled for a purpose which will be hereinafter apparent.

Adapted to be removably positioned in the recess of the mold body 8 is a form or box 29 which is arranged to receive design plates 30 upon whose inner faces is formed a design which is to appear upon the outer face of the storage battery box. These design plates are self-supporting in that the corners are mitered with the result that there is no tendency whatever for them to collapse. Generally there is a tendency for these design plates to fall inwardly into the centering box and cause no end of trouble. The bottom of the box or form 29 is provided with a set of openings 29' through which an instrument may be inserted to assist in removing the complete battery box therefrom.

While any desired number of core members may be employed I have for convenience shown three, each of which is tapered toward its lower or outer end and provided at that point with ribs 31 which form upon the bottom of the storage battery box the usual spaced ribs. Each of these core members 32 is hollowed out and may have connection with a source of steam supply, should it be desired to use the mold for a continuous curing process. The upper end of the core members are received in a recess formed in the lower face of the core carrying head and are retained therein by sets of spaced machine screws whose heads are countersunk. The sides of the core carrying head 33 are inclined or bevelled at an angle corresponding to the bevel 27 of the centering head 25, this bevel serving to accurately center the cores within the box or form 29. It is quite apparent that there being no relative lateral movement as between the centering head 25 and the mold body 8, the only movement present will be the vertical movement as between the said members, and possibly a slight lateral movement of the cores which are being centered by the said inclined or bevelled surfaces. The head 33 which carries the cores is provided at opposite points with sockets adapted to receive handles whereby to assist in the removal of the box or form 29 and its co-acting parts through the side opening of the mold body 8.

In the operation of this mold it is necessary for the cores to be raised above the upper or top opening of the recess and in order to accomplish this, I provide a key connection between the centering head and the core carrying head 33. This connection consists in the positioning of a key as illustrated in Fig. 4, this key having substantially V-shaped channels in its opposite edges, said channels extending the full length of the key. The centering head 25 and the core carrying head 33 are provided with opposed under-cut channels 34, each of which is adapted to receive a portion of the key as illustrated in Fig. 3 consequently positively connecting the said heads.

In using this mold in what is termed the squeeze out process, the design plates 30 are positioned within the box or form 29 a plug of rubber is placed within the form 29 between the design plates; the box is then slid or placed in the recess in the mold; the door is then closed, and locked by means of the swinging latch 19, and locking nut 20; the core carrying head with its core is then forced into the interior of the form 29 under pressure from the usual platen and the centering head 25. The key having previously been positioned, the heads are reliably connected. At this point the rubber to form the storage battery box is shaped as indicated in Fig. 3 and due to the heat of the mold will sufficiently set in a short period of time to permit removal of the form 29 together with the battery box cores and the head portion 33, all of which are placed in a vulcanizer in the exact condition in which they are removed from this "squeeze out process" mold. The vulcanizer completes the formation and curing of the box. This mold has been provided with steam chambers in the door and in the top and bottom portions so that it may be if desired used in the continuous curing process. It is quite apparent that through using this mold in the manner described, that a great quantity of rubber storage battery boxes can be turned out and placed in a vulcanizer for completion of the operation which generally requires approximately 45 minutes. Through employing a mold for a "squeeze out process" and in addition for the "continuous curing" it is seen that the number of boxes turned out would be so small as to render the same impractical.

The method employed by me may be stated as consisting, first, the arranging of a form carrying design plates upon its inner face, within a heating mold; placing a block of rubber within the form and between the design plates; forcing the core or cores into the form to shape the storage battery box; heating the mold sufficiently to partially set and shape the rubber box; removing the form with the design plate, rubber storage battery boxes, and the cores with their supporting head, and placing them within a vulcanizer wherein the complete curing of the box is effected.

Manifestly, the construction shown is capable of considerable modification and such modification as may fall within the scope of my claims, I consider within the spirit of my invention.

I claim:

1. A mold of the character described comprising a body portion having a form receiving recess, a centering head arranged above the mold, and having a centering recess in the lower face, said centering recess having inwardly converging side walls, cores arranged to be moved into the recess, a head carried upon the upper end of the cores, and having its sides bevelled to fit the side walls of the centering recess, means for connecting the core head and centering head.

2. A mold of the character described comprising a body portion having a recess, a centering head arranged above the mold, a core head arranged between the centering head and body portion, cores depending from the core head, said core head having converging edges, and a transverse undercut channel in its upper face, said centering head having a recess in its lower face, the side walls being bevelled to fit the edges of the core head, the bottom wall of the recess having a transverse undercut channel adapted to aline with the aforesaid channel, a double dove-tailed key adapted to be removably arranged in the double channel to connect the two heads.

3. A mold of the character described comprising a body portion having a form receiving recess opening through the top and side of the body portion, a hinged door to close the side opening, vertically apertured lugs carried by the body portion, a centering head arranged above the body portion, vertically apertured lugs carried by said head and alined with the other lugs, guide pins carried by the upper lugs and receivable in the apertures of the lower lugs to retain the body portion and said head in vertical alinement, a core carrying head between the centering head, and the body portion, co-acting means carried by the centering head and core head to center the cores, a key to connect said members.

In testimony whereof I affix my signature.

GEORGE F. LANGERMEIER.